No. 878,977. PATENTED FEB. 11, 1908.
L. C. & I. S. MERRELL & W. B. GERE.
PROCESS FOR SEPARATING THE MOISTURE FROM THE CONSTITUENT SOLIDS OF LIQUIDS.
APPLICATION FILED JULY 15, 1907.
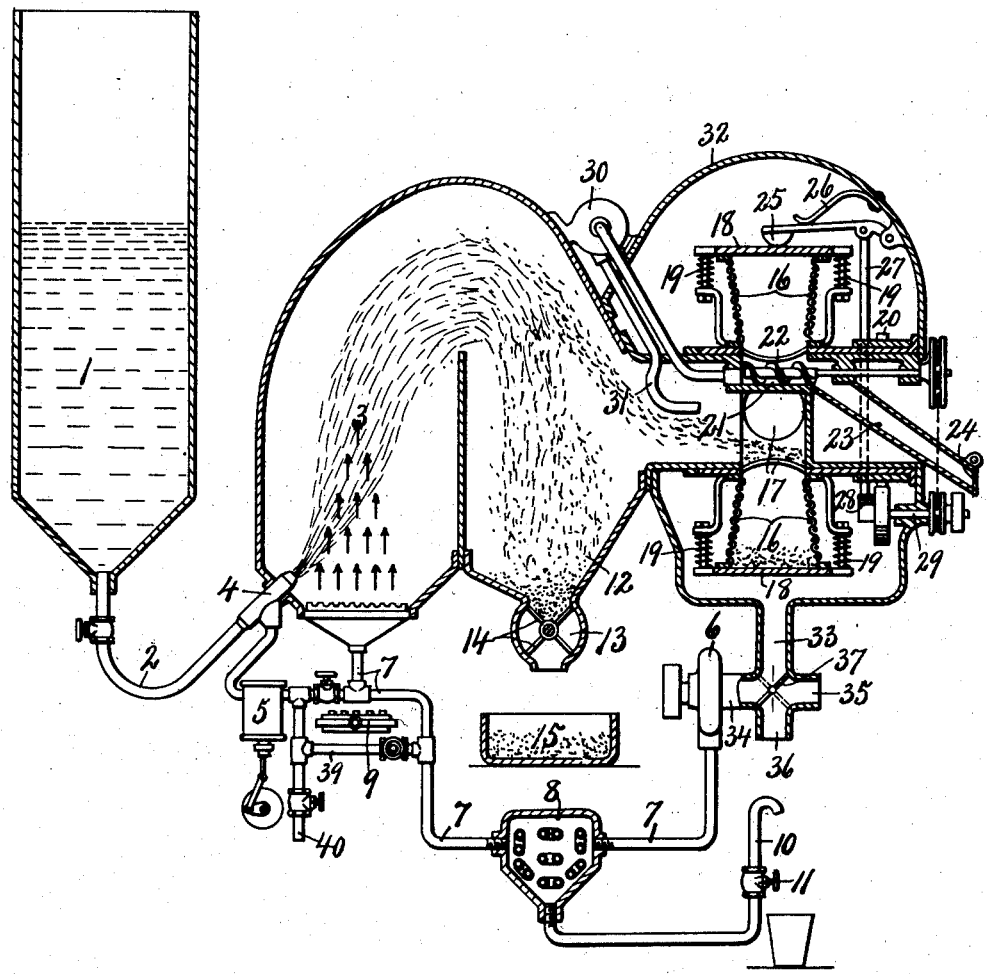

UNITED STATES PATENT OFFICE.

LEWIS C. MERRELL, IRVING S. MERRELL, AND WILLIAM B. GERE, OF SYRACUSE, NEW YORK, ASSIGNORS TO MERRELL-SOULE COMPANY, OF SYRACUSE, NEW YORK, A CORPORATION OF NEW YORK.

PROCESS FOR SEPARATING THE MOISTURE FROM THE CONSTITUENT SOLIDS OF LIQUIDS.

No. 878,977.

Specification of Letters Patent.

Patented Feb. 11, 1908.

Application filed July 15, 1907. Serial No. 383,740.

*To all whom it may concern:*

Be it known that we, LEWIS C. MERRELL, IRVING S. MERRELL, and WILLIAM B. GERE, of Syracuse, in the county of Onondaga, in the State of New York, have invented new and useful Improvements in Processes for Separating the Moisture from the Constituent Solids of Liquids, of which the following, taken in connection with the accompanying drawings, is a full, clear, and exact description.

This invention relates to process for separating the moisture from the constituent solids of liquids, and semi-liquids, and recovering such solids in the form of a substantially dry powder, which may, by the addition of suitable moisture, be reconstituted into a liquid or semi-liquid possessing all of the characteristics of the original liquid or semi-liquid, and contemplates the commercial pulverization of animal and vegetable substances, including broadly, juices, pulps, extractives, and highly organized substances containing ferments, living cells, or active organisms, as yeast, diastase and pepsin, and any other liquid and semi-liquid, the solids of which it is desirable to reduce to dryness without changing their chemical structure, and is for a modification of the process set forth in our copending application filed August 29, 1906, Serial No. 332,515.

The object of this invention is a process for desiccating liquids and semi liquids, as above set forth, by which the atoms of the material may be submitted to a temperature much higher than the temperature at which the material atoms would ordinarily caramelize or be burned, and to that end it has been found necessary to strengthen the liquid prior to desiccation, or it in other words, amounts to a preliminary removal of a considerable percent. of the moisture of the milk or other substance, so that the material while in the form of a spray, will contain so small a percentage of moisture that such moisture can be instantly taken up by the air or gas in the dry state, in which the latter enters the desiccating chamber. In our application heretofore referred to, it will be seen that this is accomplished by concentrating the liquid prior to desiccation, but we have found that the same results may be obtained by thickening the liquid, or strengthening it, in milk, for example, by the addition of a suitable quantity of milk, which has been previously dried, so as to put it into a viscid condition. We do not, however, limit ourselves to the use, for example, of dry milk for strengthening milk, or even the dry powder of the same liquid, as it will be evident that a great many other materials may be used for such purpose, such as flour, sugar, and the like, the particular object being to reduce the liquid to be dried to a viscid condition, which puts it in the same condition as though a large part of the moisture had been removed which may be accomplished, by adding flour, sugar, dry milk, and the like, so as to produce the specific gravity desired, which is another way of strengthening the liquids.

It would be impossibe to give the exact specific gravity at which various liquids should be treated for the reason that each of them vary much in themselves, but taking as an example, whole milk, of a good average quality, it has been found that the best results are obtained where it has been strengthened to a degree of viscosity at a density of from 14° to 15° Baumé, although we have found that fair results are obtainable with a preliminary strengthening to a density as low as 10° Baumé.

Our process will be readily understood from the accompanying drawings, which represent a vertical section, partly in elevation, of the apparatus designed to carry out this process.

The material to be treated is first put in the condition of viscosity, or density as above set forth, in any suitable way. It is then placed in the reservoir —1— where it passes through the pipe —2— into the desiccating chamber —3—. At the introduction of the liquid into the desiccating chamber it is subdivided into minute particles by forcing it through one or more spraying devices, as —4—, preferably by means of a pressure device, as a pump —5—, but it may be introduced by gravity from the reservoir —1—. The minute particles are caused to simultaneously commingle with a moisture-absorbing fluent, as dry air, or air or gas having an avidity for moisture, which is forced by a pressure device, as a pump —6—, through the conduit —7— into the desiccating chamber, intercepting the path of the inflowing liquid spray, the intense evaporation produced thereby upon the spherical surface of the particles, causing a cooling effect upon their solids. The air, either before or after entering the pump —6—, is preferably passed through a drying chamber —8—, in this instance, supplied with a cooling medium, by means of which part of the moisture of the air may be precipitated by condensation, and the air is then heated and expanded by the heater —9—, thereby materially increasing its avidity and power for absorbing moisture previous to its introduction into the desiccating chamber.

The drying chamber —8— is provided with a stand pipe —10— having a valve —11—, which is closed, upon the initial introduction of the air into the drying chamber to prevent the escape of the air to atmosphere through the pipe —10—, and opened as soon as sufficient water has been collected in the drying chamber to fill the stand pipe, which is tall enough to hold a volume of water capable of substantially counter-balancing the air pressure within the drying chamber, whereupon the excess of water is free to drip continuously from the open end of the stand-pipe.

Part of the dry powder resulting from desiccation may gravitate into a receptacle —12— having an outlet 13— provided with a rotary gate —14—, which may be operated manually or by any available power to automatically discharge the dry product into a receptacle —15—, while the moisture-laden air is passed through an air pervious screen, as bolting cloth, which practically confines within certain limits, the balance of the dry solids so that they may be collected and removed automatically, or at the will of the attendant. These solids may be separated from the moisture laden air in a rotary dust collector consisting of, in this instance, four tubular screen partitions —16—, communicating through openings —17— with the interior of the desiccating chamber, each tubular screen having its outer end closed by a head —18— which is movable radially against the action of the spring —19—. This dust collector is rotated intermittently one quarter turn at a time, by suitable gears —20—, one of which, as the driving gear, is mutilated in such manner as, when rotated continuously, to cause the openings —17— of the screen partition to be successively brought into registration with the open side of the receptacle —21—, in which is movable, a screw conveyer —22—, for the purpose of removing the powder into a chute —23—, whence it may be discharged through a self-closing valve —24— into a receptacle, not shown.

The mutilated driving gear —20— permits the screen partition to remain at rest, while one of them, cut off from the desiccating chamber, is discharging into the receptacle —21—, and the others in communication with the desiccating chamber, are permitting the escape of the moisture-laden air and collecting and retaining the desiccated product. The powder, which may adhere to the sides of the discharging screen partition, is removed, partly by agitation, and partly by suction, the agitating means consisting of a beater —25— acting upon the head —18— through the medium of a spring —26—, and an operating rod —27—, which is actuated by a revolving toothed rack —28—, on the main driving shaft, as —29—. This toothed rack is mutilated in such manner as to actuate the beater while the screen partitions are at rest, and to cease such action immediately before the next quarter turn of the dust collector.

The removal of the powder from the discharging screen partition is facilitated by a suction pump —30— having its inlet communicating with the interior of the receptacle —21— and its outlet communicating through a conduit —31—, with the interior of the desiccating chamber, the mouth of the chute —23— being provided with a self-closing valve —24— to prevent neutralization of the suction.

In some instances, the moisture laden air is returned to a drying chamber —8—, whence its moisture having been reduced, it is again introduced into the desiccating chamber, and for this purpose the dust collector is inclosed in a suitable casing —32—, having an outlet —33— terminating in three branches —34—, —35— and —36—; the branch —34— leading to the inlet of the pump —6—, while the other branches —35— and —36— communicate with atmosphere. At the junction of these branches is placed a rotary valve or gate 37— which may be adjusted to open communication between the outlet —33— and the branch —34—, cutting off communication between the pump —6— and atmosphere, or such valve may be adjusted to open communication between the outlet —33— and atmosphere through the branches —35—, and to establish similar communication between the branch —34— and the branch —36—, said valve being adjusted to any intermediate position to open communication between both the pump and interior of the casing —32— and atmosphere.

The pump —5— is connected through a valve conduit to the conduit —7— to enable dry heated air from the drying chamber —8— to pass into the pump —5—, whence it may be forced through the spraying device —4—, said pump being also connected to the conduit —7—, by an auxiliary valve conduit —39—, avoiding the heater —9—. By adjusting these valves to admix the dry heated air with the dry cool, air of any desired temperature may be furnished to the spraying devices —4—, or atmospheric air, or air or gas having an avidity for moisture, may be drawn through a supplementary valve conduit —40—.

Upon the introduction of air into the desiccating chamber, its temperature is considerably reduced by the rapid evaporation of the moisture-content of the spray, so that air of a very high temperature may be introduced to desiccate liquids, the solids of which will be impaired if heated to such a temperature in the original state, as for example, in the desiccation of milk, air of a temperature of from 300° to 400° F. may be used successfully, the air being reduced in temperature by the vaporization of the moisture to from 140° F. to 200° F., both of these latter temperatures being above the coagulating point of milk albumen, but below the temperature at which milk-sugar is caramelized without impairing in any degree the original chemical or physical temperature of the solids.

Air, lower in temperature than normal atmospheric air, may be introduced into the desiccating chamber, the heating device then serving, without heating said air above normal atmospheric temperature, only to expand it and increase its moisture-absorbing power, after it has been cooled and dried in the drying chamber; as, for example, nitrogen-fixing bacteria may be cultivated in sterilized skim milk and this liquid sprayed into and commingled with dried air at a temperature of, for example, 65° F. thereby recovering the bacteria alive and of unimpaired strength mingled with the milk solids.

Liquids containing fats or oils either in natural or emulsified state, in the presence of a suitable substance, as albumen, may be desiccated without causing the oleaginous constituent to be rendered or melted out, owing to the cooling effect produced on the solids; as, for example, the butter-fat in cream retains a globular form when the cream is reduced to a dry powder, or castor oil may be emulsified with gum arabic and the liquid reduced to a dry powder, so retaining the oils that the powder is not greasy. The temperature of the air with which the dry powder comes in contact is preferably, but not necessarily, below the melting point of the oleaginous constituent; as for example, milk, containing its full natural butter-fat constituent, may be reduced to powder, which, when dry, may be exposed to temperature as high as 212° F. without changing the globular form of its butter-fat.

The removal of the moisture, or the strengthening of the liquid by the introduction of the materials, as hereinbefore set forth, is for the purpose of putting the liquid in a viscid condition and the consequent cooling of the solids, is accomplished so rapidly as to prevent self-impairment of the solids owing to the concentration of, active non-volatile constituents, as for illustration, lactic acid in milk is prevented from combining appreciably with the salts of the milk during evaporation of the moisture, and consequent concentration of the acid.

From the foregoing description it will be readily seen that by strengthening the material prior to final desiccation the material may be desiccated by a momentary contact with the drying agent, and at a very high temperature, and the cooling effect of the rapid evaporation will prevent excessive heating of the solid constituents during such treatment, though the temperature be such as would effect a chemical change were the treatment of any given atom prolonged. As a consequence the resulting product retains all of the solids of the liquid in its normal state, practically all of the moisture having been removed by reason of our ability to accomplish the act of drying almost instantaneously, so that by the addition of a proper amount of moisture, it may be restored to its original condition.

Dry powder may be produced without pasteurization or sterilization, results which would be produced were the solid constituents subjected for any considerable time to a temperature such as employed and contemplated by this process.

What we claim is:

1. The process of obtaining the solid constituents of liquids and semi-liquids in the form of powder, which process consists in rendering said liquids viscous by the addition of a compatible material, then converting the mixture into a fine spray, bringing such spray into a current of dry air or gas having an avidity for moisture so that substantially all the remaining liquid constituents are separated thereby, conveying the dry powder into a suitable collecting space away from the air or gas current, and discharging the air or gas separately from the dry powder.

2. The process of obtaining the solid constituents of liquids and semi-liquids in the form of a dry powder, which process consists in rendering said liquids viscous by the addition of a compatible material, then converting the liquid material into a spray, bringing such spray into a current of heated air or gas having an avidity for the moisture of the substance treated, retaining the atoms momentarily in said current so that substantially all of the remaining moisture is converted into vapor and the product is prevented by the cooling effect of such evaporation from undergoing chemical change, conveying the dry powder into a suitable collecting space away from the vaporizing current and discharging the air or gas separately from the dry powder.

In witness whereof we have hereunto set our hands this 13th day of July 1907.

LEWIS C. MERRELL.
IRVING S. MERRELL.
WILLIAM B. GERE.

Witnesses:
H. E. CHASE,
HOWARD P. DENISON